United States Patent Office 2,806,031
Patented Sept. 10, 1957

1

2,806,031

3,4-DIHYDRO-2H-1,3-BENZOXAZINES

Raymond H. Rigterink, Midland, Mich., assignor to The Dow Chemical Company, Midland, Mich., a corporation of Delaware No Drawing. Application April 30, 1956,
Serial No. 581,283

6 Claims. (Cl. 260—244)

This invention is concerned with 3,4-dihydro-2H-1,3-benzoxazines having the structure

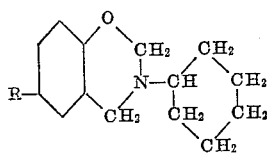

wherein R represents an alkyl radical containing from 4 to 7 carbon atoms, inclusive, and characterized by a straight chain of at least 3 carbon atoms attached directly to the aromatic nucleus through a terminal carbon. These new compounds are crystalline solids or oils soluble in many common organic solvents and substantially insoluble in water. They are useful as the active toxic ingredients of herbicides to be employed for the control of undesired vegetation. They are also useful as toxic constituents of germicidal compositions for the control of bacteria such as *Salmonella typhosa* and *Staphylococcus aureus* and fungi such as *Aspergillus terreus* and *Rhizopus nigricans*.

The new 3,4-dihydro-2H-1,3-benzoxazines may be prepared by causing cyclohexylamine to react with formaldehyde to form an intermediate formaldehyde condensation product of the amine. The latter is then caused to react with an appropriate 4-alkylphenol to form the desired 6-alkyl-3-cyclohexyl-3,4-dihydro-2H-1,3 - benzoxazine.

In carrying out the first step of the reaction, a molecular proportion of the amine is added to two molecular proportions of formaldehyde in an appropriate solvent such as methanol or ethanol as reaction medium. The reaction takes place smoothly in the temperature range from 10° to 35° C. with the formation of the desired intermediate formaldehyde condensation product of the amine. The reaction is somewhat exothermic and cooling may be required to maintain temperature control.

In the second step of the reaction, about one molecular proportion of the phenolic compound or an alcoholic solution thereof is added to the reaction mixture prepared as described above. The reaction takes place smoothly when the mixture is heated over the temperature range of from 75° to 90° C. for a period of from 15 minutes to several hours. The mixture is usually stirred during the heating period to facilitate reaction. After completion of the reaction period, the mixture is heated under reduced pressure to distill the solvent and water of reaction and to recover as residue the desired 6-alkyl-3-cyclohexyl-3,4-dihydro-2H-1,3-benzoxazine product.

The following examples illustrate the invention but are not to be construed as limiting.

*Example 1.—6-secondary-butyl-3-cyclohexyl-3,4-dihydro-2H-1,3-benzoxazine*

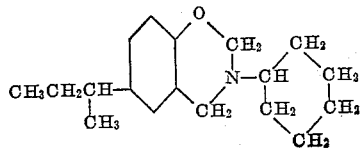

60 grams (2.0 moles) of paraformaldehyde, 1.0 gram of potassium hydroxide and 100 milliliters of methanol were mixed and heated to obtain a clear solution and then cooled. 99 grams (1.0 mole) of cyclohexylamine was added thereto in portions while stirring and cooling to maintain the temperature of the mixture below 30° C. 150.2 grams (1.0 mole) of 4-secondary-butylphenol was then added and the resulting mixture heated at about 78° C. under reflux for two hours. At the end of this period the mixture was heated under reduced pressure until the temperature in the reaction mixture was 120° C. at 2 millimeters pressure to distill alcohol and water and to obtain as residue a 6-secondary-butyl-3-cyclohexyl-3,4-dihydro-2H-1,3-benzoxazine product in a yield of 266 grams or 97.4 percent of theoretical. The latter was a reddish-brown viscous oil having a refractive index $n_D^{25}$ of 1.5370.

*Example 2.—3-cyclohexyl-3,4-dihydro-6-(1-methylbutyl)-2H-1,3-benzoxazine*

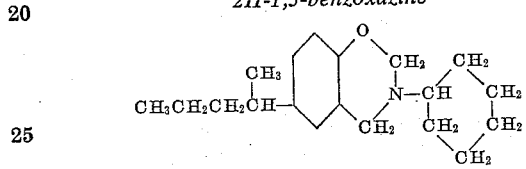

60 grams (2.0 moles) of paraformaldehyde, 1.0 gram of potassium hydroxide and 100 milliliters of methanol were mixed and heated to obtain a clear solution and then cooled. 99 grams (1.0 mole) of cyclohexylamine was added thereto in portions while stirring and cooling to maintain the temperature of the mixture below 30° C. 164.2 grams (1.0 mole) of 4-(1-methylbutyl)phenol was then added and the resulting mixture stirred and heated at about 78° C. under reflux for two hours. At the end of this period, the resulting mixture was heated under reduced pressure until the temperature in the reaction mixture was 120° C. at 2 millimeters pressure to distill alcohol and water and to obtain as residue a 3-cyclohexyl-3,4-dihydro-6-(1-methylbutyl)-2H-1,3-benzoxazine product in a yield of 278 grams or 96.8 percent of theoretical. The latter was a reddish brown viscous liquid having a refractive index $n_D^{25}$ of 1.5298.

*Example 3.—6-(1,1-dimethylpropyl)-3-cyclohexyl-3,4-dihydro-2H-1,3-benzoxazine*

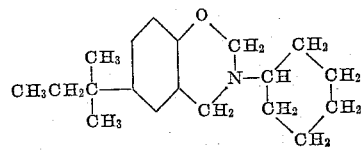

60 grams (2.0 moles) of paraformaldehyde, 1.0 gram of potassium hydroxide and 100 milliliters of methanol were heated to obtain a clear solution and then cooled. 99 grams (1.0 mole) of cyclohexylamine was added thereto in portions while stirring and cooling to maintain the temperature in the range of from 20° to 30° C. 164.2 grams (1.0 mole) of 4-tertiary-amylphenol was then added and the resulting mixture heated at about 79° C. under reflux for two hours. Two liquid phases formed during the heating period. The mixture was allowed to cool and stand at room temperature overnight. It was then heated under reduced pressure until the temperature in the reaction mixture was 120° C. at 2 millimeters pressure to distill alcohol and water and to obtain as residue a 6-(1,1-dimethylpropyl) - 3 - cyclohexyl-3,4-dihydro-2H-1,3-benzoxazine product in a yield of 280 grams or 97.5 percent of theoretical. The latter was an amber-colored viscous oil having a refractive index $n_D^{25}$ of 1.5390.

*Example 4.—6-normal-pentyl - 3 - cyclohexyl-3,4-dihydro-2H-1,3-benzoxazine*

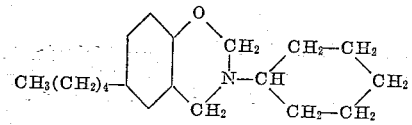

6 grams (0.2 mole) of paraformaldehyde, 0.1 gram of potassium hydroxide, and 100 milliliters of 95 percent ethanol were mixed and warmed to obtain a clear homogeneous solution. 9.9 grams (0.1 mole) of cyclohexylamine was added thereto in portions with stirring and cooling to maintain the temperature at from 25° to 30° C. 16 grams (0.1 mole) of 4-normal-pentylphenol was then added and the resulting mixture heated at about 82° C. under reflux while stirring for two hours. At the end of this period, the pressure on the system was reduced and the mixture heated to 100° C. at 10 millimeters to distill the alcohol and water and to obtain as residue a 3-cyclohexyl-3,4-dihydro - 6 - normal-pentyl-2H-1,3-benzoxazine product. The latter was a light brown viscous liquid having a refractive index $n_D^{25}$ of 1.5320.

*Example 5.—3-cyclohexyl-6-(1-ethyl-1-methylbutyl)-3,4-dihydro-2H-1,3-benzoxazine*

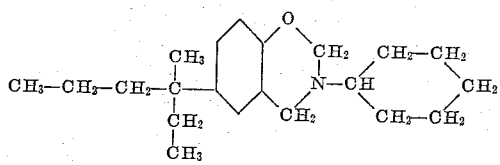

18 grams (0.6 mole) of paraformaldehyde, 0.3 gram of potassium hydroxide and 100 milliliters of 95 percent ethanol were mixed and heated with stirring to obtain a homogeneous solution. The mixture was cooled and 29.7 grams (0.3 mole) of cyclohexylamine added thereto with stirring and cooling to maintain the temperature at from 25° to 30° C. 57.7 grams (0.3 mole) of 4-(1-ethyl-1-methyl-butyl)phenol was added to the resulting mixture and the latter heated with stirring at about 82° C. under reflux. After the heating period the pressure on the system was reduced and the mixture heated to a final temperature of 100° C. under 10 millimeters pressure to distil alcohol and water and to obtain as residue a 3-cyclohexyl-6-(1-ethyl-1-methylbutyl) - 3,4 - dihydro-2H-1,3-benzoxazine product. The latter was a light reddish-brown very viscous liquid having a refractive index $n_D^{25}$ of 1.5328.

*Example 6.—3-cyclohexyl - 6 - (1,1-dimethylbutyl)-3,4-dihydro-2H-1,3-benzoxazine*

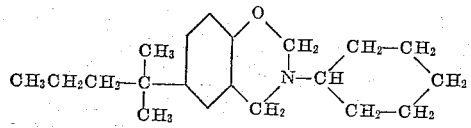

24 grams (0.8 mole) of paraformaldehyde, 0.5 gram of potassium hydroxide and 100 milliliters of 95 percent ethanol were mixed and heated with stirring to obtain a clear solution. The solution was allowed to cool and 39.6 grams (0.4 mole) of cyclohexylamine was added portionwise and with cooling to maintain the temperature at from 25° to 30° C. The reaction occurred with evolution of heat. 71.2 grams (0.4 mole) of 4-(1,1-dimethylbutyl)phenol was added thereto and the resulting solution heated under reflux with stirring for two hours. During the heating, the solution became cloudy and separated into two layers. The resulting mixture was allowed to stand overnight at room temperature. The heterogeneous mixture was heated to a final temperature of 100° C. at 10 millimeters to distill alcohol and water and to obtain as residue a 3-cyclohexyl-3,4-dihydro-6-(1,1-dimethylbutyl)-2H-1,3-benzoxazine product. The latter was a brown viscous liquid having a refractive index $n_D^{25}$ of 1.5329. The product was very soluble in petroleum ether and ethanol.

Many of the 4-alkylphenols employed in the preparation of the benzoxazines of this invention are available commercially. The alkylphenols may also be prepared by causing an appropriate alkanol to react with phenol in the presence of aluminum chloride in the temperature range of from 20° to 45° C. After the reaction, the product may be isolated and purified by conventional procedures.

The products of the preceding examples are effective as antimicrobials and may be employed for the control of bacterial and fungal organisms. They may also be used as herbicides for the control of undesired vegetation. In a representative operation, 100 percent controls of vegetation were obtained when foliage of turnip, *Brassica napus*, was sprayed with a herbicidal composition containing as sole toxic ingredient 0.05 percent of the 4-(1,1-dimethylpropyl) - 3 - cyclohexyl-3,4-dihydro-2H-1,3-benzoxazine compound.

I claim:

1. A 3,4-dihydro-2H-1,3-benzoxazine having the structure

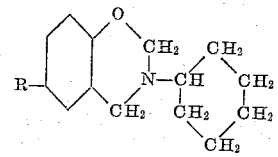

where R represents an alkyl radical containing from 4 to 7 carbon atoms, inclusive, and characterized by a straight chain of at least 3 carbon atoms attached directly to the aromatic nucleus through a terminal carbon.

2. 6 - secondary-butyl - 3 - cyclohexyl-3,4-dihydro-2H-1,3-benzoxazine.

3. 6-(1,1-dimethylpropyl) - 3 - cyclohexyl-3,4-dihydro-2H-1,3-benzoxazine.

4. 3-cyclohexyl-3,4-dihydro-6-(1-methylbutyl)-2H-1,3-benzoxazine.

5. 6-normal-pentyl - 3 - cyclohexyl-3,4-dihydro-2H-1,3-benzoxazine.

6. 3-cyclohexyl - 6 - (1-ethyl - 1 - methylbutyl)-3,4-dihydro-2H-1,3-benzoxazine.

References Cited in the file of this patent

FOREIGN PATENTS 695,550    Great Britain _____ Aug. 12, 1953

OTHER REFERENCES

Burke et al.: CA, vol. 47, col. 9292 (1953).
Burke et al.: CA, vol. 48, col. 145 (1954).